US006950926B1

(12) United States Patent
Menezes

(10) Patent No.: US 6,950,926 B1
(45) Date of Patent: Sep. 27, 2005

(54) USE OF A NEUTRAL INSTRUCTION AS A DEPENDENCY INDICATOR FOR A SET OF INSTRUCTIONS

(75) Inventor: Evandro Menezes, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 622 days.

(21) Appl. No.: 09/798,177

(22) Filed: Mar. 2, 2001

(51) Int. Cl.$^7$ ................................................. G06F 9/30
(52) U.S. Cl. ..................................................... 712/216
(58) Field of Search ................................. 712/216, 217

(56) References Cited

U.S. PATENT DOCUMENTS

| | | | | |
|---|---|---|---|---|
| 5,872,948 A | | 2/1999 | Mallick et al. ............. | 395/390 |
| 5,941,983 A | * | 8/1999 | Gupta et al. ................ | 712/214 |
| 6,154,828 A | | 11/2000 | Macri et al. ................... | 712/24 |
| 6,212,623 B1 | * | 4/2001 | Witt ........................... | 712/216 |
| 6,260,189 B1 | * | 7/2001 | Batten et al. ............... | 717/151 |
| 6,430,683 B1 | * | 8/2002 | Arimilli et al. ............. | 712/245 |
| 6,457,118 B1 | * | 9/2002 | Peng et al. ................. | 712/226 |

OTHER PUBLICATIONS

John L Hennessy and David A Patterson, Computer Organization and Design—The Hardware/Software Interface, 1998, Morgan Kaufman Publishers, 2$^{nd}$ Edition, pp. 515-516.*

Andrew S Tanenbaum, Structured Computer Organization, 1984, Prentice-Hall Inc, 2$^{nd}$ Edition, pp. 10-12.*

The Authoritative Dictionary of IEEE Standard Terms; IEEE Press; 7th Edition; 2000; p. 762.*

U.S. Appl. No. 09/997,117, filed Dec. 16, 1997, D'Arcy et al., pp. 1-29 and figure 2.*

* cited by examiner

*Primary Examiner*—William M. Treat
(74) *Attorney, Agent, or Firm*—Zagorin O'Brien Graham LLP

(57) ABSTRACT

A dependency instruction encodes dependency information among a group of instructions. A processor decodes the dependency instruction associated with the group of instructions. The processor can then execute the group of instructions in an order based on the dependency information in the dependency instruction. The dependency information may be encoded in a neutral instruction so processors that do not support dependency instructions can execute a program containing them.

46 Claims, 2 Drawing Sheets

USE OF A NEUTRAL INSTRUCTION AS A DEPENDENCY INDICATOR FOR A SET OF INSTRUCTIONS

BACKGROUND OF THE INVENTION

1. Field of the Invention

This invention relates to computer architectures and more particularly to identifying data dependencies among instructions.

2. Description of the Related Art

In an effort to make computers as efficient as possible, processors have relied on parallelism to achieve processing efficiencies. In particular, processor architectures have developed in which multiple instructions are executed in parallel on multiple execution units, such as integer units, floating point units, etc.

Typically, instructions direct computer operations by causing an operation to occur on data. The operation may be, e.g., an arithmetic operation, a load/store operation, or a logical operation. The instruction specifies the operation as well as the operand(s) affected by the operation. The instruction specifies the "operand" by describing its location in the computer. Operands may be located in a register in which case a register within the processor contains the data on which the instruction operates. Operands may also be located in memory. Operands may also be immediate, in which case the data is contained in the instruction itself. A source operand value is a value upon which the instruction operates, and a destination operand is a location in which the results of the instruction are stored.

One problem with executing instructions in parallel is that operands required to complete operations specified by the instruction may not be available. For example, assume an instruction B uses an operand whose value is determined by a previous instruction A, and instruction A has not yet completed. In that circumstance, instruction B has to wait for the operand value to be determined by instruction A and therefore cannot be executed in parallel with the instruction A. For a set of three instructions (A, B, C), the following patterns of dependency are possible: no dependency; B depends on A's results; C depends on A's result; both B and C depend on A's result; C depends on B's result; C depends on A's and B's results; C depends on B's result, which depends on A's result, i.e., serial dependency.

In a computer system that executes multiple operations per machine cycle, either software (i.e., the compiler) or hardware control logic determines those functional operations that may be executed in parallel. In the example above for instructions A, B, and C, if there are no dependencies among A, B, and C, all three instructions may be executed in parallel (assuming there are three execution units available). If, e.g., B depends on A's results, then A and C may be executed in parallel, and B subsequently.

In Very Long Instruction Word (VLIW) computer architectures, a compiler (i.e., software) determines those operations that can be executed in parallel when translating a high level source language such as C++ into machine instructions suitable for execution. The compiler accounts for the data dependencies in the compiled code. When the executable code is presented to the VLIW processor, the VLIW processor executes the code without having to worry about data dependencies. Thus, one advantage of a VLIW architecture is that the hardware does not have to check for data dependencies among instructions.

Another way to account for data dependencies in prior art systems was to simply execute the code in order without parallelism. In that way, data dependency problems are eliminated, but so are the advantages of parallel execution.

In addition to executing operations in parallel, another way that computer architectures improve performance is to overlap the execution steps of different instructions using pipelining. In pipelining, the various steps of instruction execution are performed by independent units called pipeline stages. Pipeline stages are generally separately clocked registers, and the steps of different instructions are executed independently in different pipeline stages. Thus, one instruction may be fetched, another decoded and a third instruction executed all at the same time in a pipelined architecture. Overlapping various stages of instruction execution reduces the average number of cycles required to execute an instruction, but not the total amount of time required to execute an instruction.

Superscalar processor architectures also provide greater efficiencies by concurrently executing multiple instructions. The term "superscalar" describes a computer architecture that includes concurrent execution of scalar instructions. Scalar instructions are the type of instructions typically found in general purpose microprocessors. Because instructions are executed concurrently, greater efficiency can be achieved. However, unlike VLIW architectures, the compiler program for a superscalar processor translates source code into an executable file but does not need to determine and solve the problem of data dependencies. Instead, control logic determines if there are data dependencies which constrain parallel execution of instructions. Conceptually, for a given window of instructions, e.g., 8 instructions, hardware detects data dependencies by checking to see if any operand depends on an output of a previous instruction. Note that although instructions may be executed out of order, instructions are retired in program order.

Typical superscalar computer architectures hold the execution of an instruction that needs data that is not available yet, either because the data has not been fetched or because the data is the result of a previous instruction that has not finished executing. If the processor cannot find an instruction to execute that has no dependencies (or if it has run out of resources to track dependencies), the processor just stalls execution of any instruction until the data arrives (thus creating a pipeline "bubble").

Superscalar processors generally devote a significant processor area to circuitry used to identify data dependencies among a set of instructions so that the processor can appropriately execute instructions. Such dependency hardware is rather complex since there are multiple data dependencies possible between any two instructions. A typical reduced instruction set computer (RISC) instruction commonly used in superscalar implementations has two input operands and one output value. The number of dependencies between groups of instructions in an instruction window grows significantly with the number of instructions since an additional instruction has to be compared with every other instruction in the group. Complexity is also determined by the number of instructions that the processor attempts to decode, issue, and complete at the same time (e.g., in a single cycle). In one approach, dependency is checked by comparing the addresses of the source registers of each instruction to the addresses of the destination registers of each previous instruction in the group. For example, if instruction A reads a value from a register that is written to by instruction B, then instruction A is dependent upon instruction B and instruction A cannot start until instruction B has finished.

It would be advantageous to execute instructions without paying the overhead required to check for data dependencies in hardware or having to provide compiled code which does not have data dependencies, e.g., in the VLIW approach.

SUMMARY OF THE INVENTION

Accordingly, the invention utilizes instructions to specify the dependencies in a group of instructions so that the dependencies do not have to be determined on the fly during execution. In that way, either a significant amount of logic devoted to dependencies can be removed or at least less frequent use of such dependency logic could save power.

In one embodiment, the invention provides a method for determining dependencies among a group of instructions executed in a processor. The method includes fetching a first group of instructions and an associated dependency instruction from a storage. The dependency instruction encodes dependency information among the first group of instructions. The processor then decodes the dependency instruction associated with the first group of instructions. The processor can then execute the first group of instructions in an order based on the dependency information in the dependency instruction. In one preferred embodiment, the dependency information is encoded as a neutral instruction.

In another embodiment, the invention provides a method of generating instructions, e.g., in a compiler, that includes determining data dependencies among a first group of instructions and generating a data dependency instruction associated with the first group of instructions specifying the data dependencies among the first group of instructions.

In still another embodiment, the invention provides a computer program product that includes a first group of instructions. The computer program product further includes a data dependency instruction associated with the first group of instructions. The data dependency instruction encodes data dependency information for the first group of instructions

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicate similar or identical items.

DESCRIPTION OF THE PREFERRED EMBODIMENT(S)

In order to avoid the hardware cost and machine cycles to detect data dependencies, instructions can be used during execution to specify the data dependencies among a group of instructions. Processors have instructions that are explicitly innocuous, such as the NOP instruction, which does not affect the machine state in any way. In x86 architectures, the NOP instruction performs the instruction (XCHG AX, AX), which exchanges the contents of register AX with itself. Other instructions in the x86 architecture are effectively innocuous. An example of an effectively innocuous instruction would be to exchange BX with BX. Such an exchange would have no affect on the machine state and thus would be effectively innocuous. An instruction such as the instructions described above that has no effect on machine state will be referred to herein as a neutral instruction. Such neutral instructions can be used to provide the processor information about the data dependencies between instructions in a given set of instructions.

In one embodiment, unique neutral instructions are used to encode dependency patterns between instructions in a given set. The instruction set may, e.g., precede or succeed the neutral instruction defining the interdependencies within the set.

Returning again to the example with instructions A, B, and C, (assuming A, B, C would be the in-order execution sequence) the following patterns of dependency are possible:
(1) no dependency;
(2) B depends on A's results;
(3) C depends on A's result;
(4) both B and C depend on A's result;
(5) C depends on B's result;
(6) C depends on both A's and B's results;
(7) C depends on B's results which depends on A's (or serial dependency).

In order to encode those dependencies, in one embodiment, a separate neutral instruction is supplied for each possible dependency relationship. Thus, condition 1 could be defined by an instruction exchanging BX with BX (XCHG BX, BX), condition 2 could be defined by an instruction exchanging CX with CX, etc. In fact, the XCHG instruction in the x86 instruction set architecture can be used with any of 8 general word registers (AX, BX, CX, DX, BP, SI, DI and SP) or with any of 8 byte registers (AH, DH, CH, BH, AL, DL, CL and BL) to provide 16 potential separate neutral instructions. Other instructions in the X86 architectures can be used as well. For example, the MOV AX, AX instruction can also be used. As with the XCHG instruction, the MOV instruction may be used with the 8 general word registers or the 8 byte registers to provide 16 more potential neutral instructions.

Other neutral instructions may be available as well. For example, certain architectures may define a particular register as read only, and a write to such a register has no effect and may therefore be utilized as a neutral instruction. In addition, the data that is "written" to the read only register may be used to encode the dependencies as described further herein.

Figure 1:
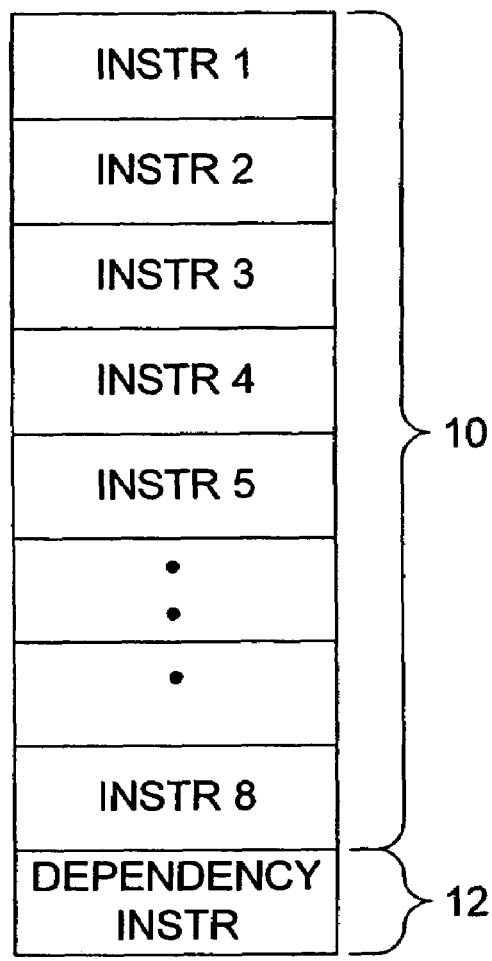
FIG. 1 shows a group of instructions along with a neutral instruction that defines the dependency relationships among the group of instructions.

The neutral instructions may be inserted into the instruction stream as the source code is compiled. More particularly, as the compiler translates source code into machine specific code, it detects the data dependencies for a group of instructions. In the simplified example just given, the compiler determines the data dependencies for the group of three instructions A, B, and C. The compiler inserts an appropriate neutral instruction in a predetermined place with relation to the three instructions, e.g., immediately before or after. As shown in FIG. 1, the compiler generates a group of instructions 10 along with a neutral instruction 12 that defines the dependency relationships among the instructions 10. When the compiled code is executed, the instruction decoder, assuming that the processor is working in a mode in which data dependency instructions are used, decodes the neutral instruction to determine which of the six possible data dependency conditions shown above are true for the set of three instructions. The instructions will then be executed in an order consistent with the data dependency conditions. For example, if the neutral instruction corresponds to condition 1, then all the instructions can be executed concurrently. If condition 5 is true, then execution of B must precede execution of instruction C.

Figure 2:
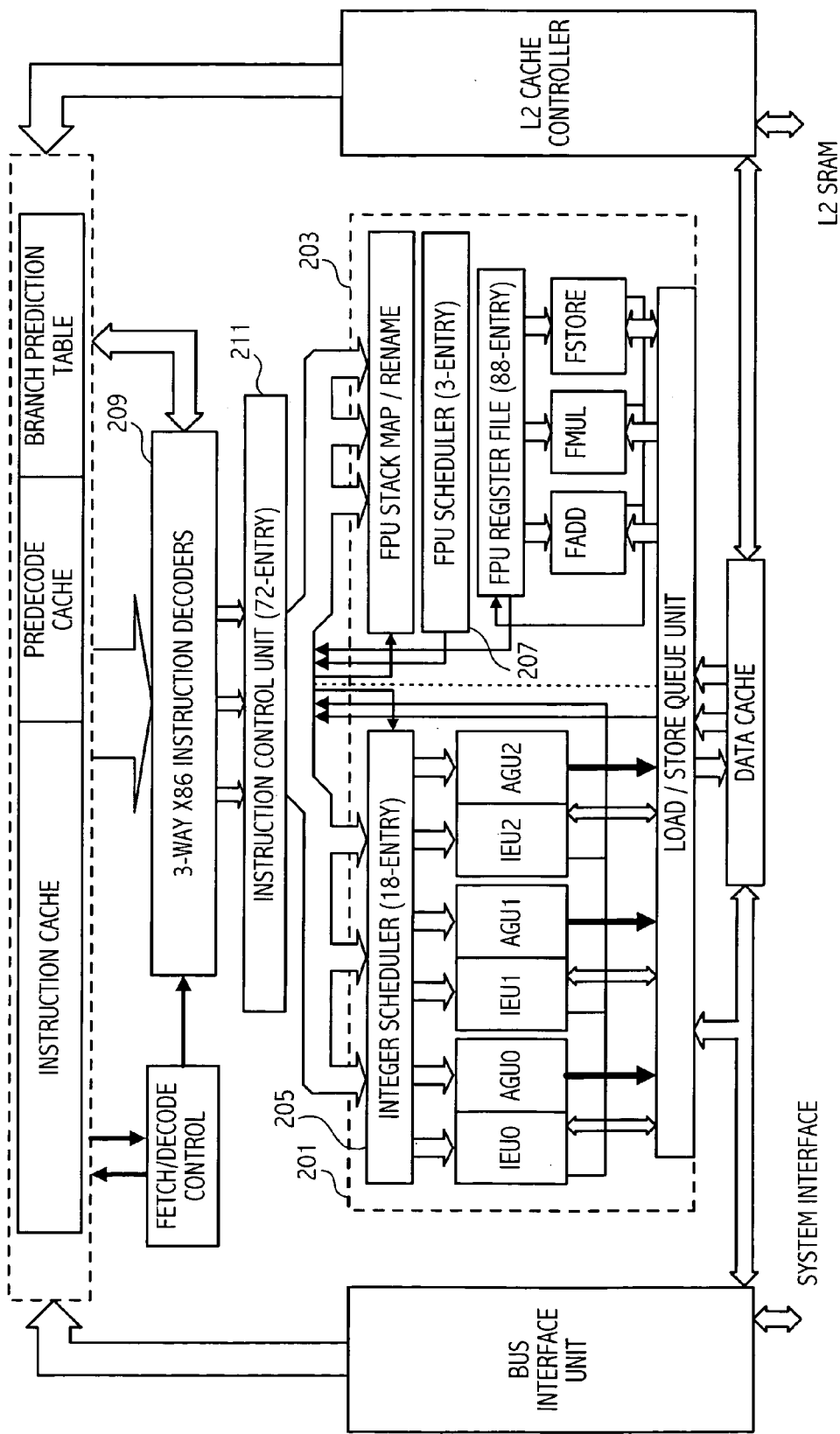
FIG. 2 illustrates an exemplary processor with a superscaler architecture.

An exemplary superscalar architecture capable of exploiting the dependency instructions described herein is shown in FIG. 2. The architecture shown in FIG. 2 includes an integer unit 201 and a floating point unit 203. The integer unit 201 utilizes a scheduler 205 to schedule out of order execution in the three integer execution units IEU0–IEU2 and the three address calculation units (AGU0–AGU2). The floating point unit includes a FPU scheduler 207 to schedule operations in the floating point unit. The decoder 209 decodes the neutral instructions and provides the decoded dependency instruction to the instruction control unit 211 and subsequently to the appropriate scheduler 205 or 207. The instructions are then executed in the execution units utilizing the decoded dependency information.

As described previously, the execution of an instruction in a superscalar architecture involves a series of pipeline stages for each execution unit. One or more pipeline stages are devoted to determining dependency information. If the data dependency information were decoded directly from the instructions, a significant advantage would come from bypassing the pipeline stage that checks data dependencies. Thus, the instruction scheduler could be provided with the dependency information directly from the neutral instruction. After the dependency is resolved, the instruction is scheduled for execution in the proper order (not necessarily program order).

It is also possible to have two or more sets of neutral instructions whose data dependency information refers to distinct types of instructions. For example, one set of neutral instructions may refer to scalar instructions and another set may refer to floating point or vector instructions. Thus, the neutral instructions define dependency relationships among instructions that execute on separate and distinct execution units. In one embodiment, each set of neutral instructions for one instruction type ignores other instruction types as not being part of the set of instructions about which dependency information is encoded. Thus, a floating point specific neutral instruction may encode information only for the next eight floating point instructions and ignore any intervening scalar instructions. In other embodiments the distinct sets of neutral instructions might provide information on common resources when, e.g., source or destination operands are common to different execution units.

The use of neutral instructions allows code that is generated by the compiler to be used by other processors that use the same instruction set but do not decode the neutral instructions as providing dependency information. In that case, the other processors would simply decode the neutral instructions as neutral instructions that would have no effect on machine state. Note that the other processors would pay a performance penalty by having to fetch and execute the neutral instructions.

The actual number of instructions in the set that the data dependency instruction specifies depends on the architecture of the processor. More particularly, it can depend on the number of instructions that can be executed simultaneously and potentially complete ahead of another instruction. There can also be relationships between a first set of instructions that has a first associated neutral instruction describing the data dependencies in the first set and a second set of instructions that has a second associated neutral instruction describing data dependencies in the second set. For example, assume each set of instructions is 8. The scheduler knows the order of execution for the first eight instructions and the next eight instructions. However, it is also possible that an instruction in the second set has a data dependency on an instruction in the first set. A neutral instruction can be used to describe the interdependency not only among the instructions in a set but also between sets. For example, a single neutral instruction (or a single bit or value in a neutral instruction data field) can specify whether any instruction in the second set depends on an instruction in the first set. If so, issue of the second set may be stalled until the first set completes or the hardware dependency checking circuitry can examine the instruction stream to decide how the subsequent set should be issued.

Those processors that use the data dependency information can eliminate part or all of the circuits that perform the data dependency checks, thus improving performance by not having to spend cycles gathering dependency information on the fly. In addition, power can be saved by eliminating circuitry required to perform the checking function, or by switching it off when not necessary.

In another embodiment, the processor such as the exemplary processor shown in FIG. 2 operates in two modes. In a first mode, data dependency instructions are used to generate data dependency information. In a second mode, data dependency information is generated on the fly by hardware checking circuits as is currently done in the art. The mode can be determined by separate neutral instructions encoding respectively the first and second mode of operations. In another embodiment, the mode can be encoded in a segment descriptor, which is used to describe attributes of memory blocks. For example, in the x86 architectures, segment descriptors reside on the CPU. In other architectures, the segment descriptors may reside in the Memory Management Unit (MMU). The segment descriptors describe the properties of the code resident in a corresponding portion of memory. Such properties may include whether the code operates on 16- or 32-bit or 64-bit operands, or such attributes as permissions (read-only or read-write), CPU mode (kernel or user mode), base address, addressing limit, etc. One of the attributes that can be added to the segment descriptor is whether the processor should operate in a mode that uses data dependency information or a mode where data dependency is determined on the fly.

Other ways can be used to specify a mode. For example, an access to a predetermined memory location or execution of a special instruction could cause a flag to be set or reset to indicate the mode of operation.

Figure 3:
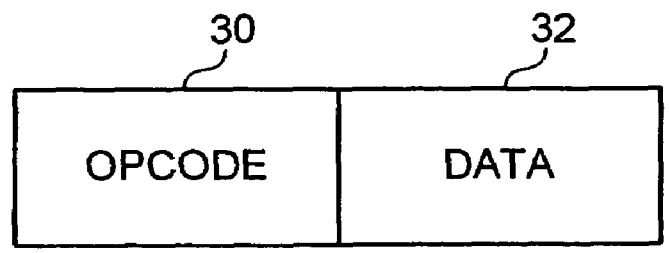
FIG. 3 illustrates an exemplary instruction encoding data dependency information.

In another embodiment, an instruction such as illustrated in FIG. 3 may be used to specify the dependency relationships. The instruction includes an opcode 30 defining the instruction as a dependency instruction. A data field portion 32 of the instruction is used to specify the data dependencies for a group of instructions. If the data field portion 32 was 8 bits, up to 256 different possible dependency relationships among a group of instructions could be specified. With 16 bits, up to 64 K data dependency relationships can be specified. The size of data field utilized and the complexity of the associated dependency logic determine how often a data dependency instruction is inserted into the instruction stream.

Thus, a method and apparatus for use of neutral instructions to encode data dependency information has been described. The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method of determining dependencies among instructions executed on a processor, the method comprising:
fetching a first group of instructions and an associated dependency instruction from a storage;
decoding the dependency instruction, the dependency instruction encoding dependency information relating to the first group of instructions,
wherein the dependency instruction is a neutral instruction, and
wherein a separate neutral instruction is used to encode each of a plurality of possible dependency relationships among the first group of instructions.

2. The method as recited in claim 1 further comprising executing the first group of instructions in an order based on the dependency information in the dependency instruction.

3. The method as recited in claim 1 wherein the neutral instruction is an effective no operation (NOP) instruction.

4. The method as recited in claim 1 wherein the dependency instruction includes a field capable of encoding a plurality of dependency relationships among the first group of instructions.

5. The method as recited in claim 1 further comprising specifying whether or not dependency instructions are included in a current instruction stream, thereby allowing a processor to execute instruction streams with and without dependency instructions.

6. The method as recited in claim 1 further comprising specifying a dependency relationship between instructions in the first group of instructions and an instruction in a second group of instructions in another dependency instruction.

7. The method as recited in claim 1 wherein the first group of instructions is of a first instruction type and the method further comprises supplying a second dependency instruction specifying dependencies for a second instruction type, the first and second instruction types executing on different execution units.

8. A method of determining dependencies among instructions executed on a processor, the method comprising:
fetching a first group of instructions and an associated dependency instruction from a storage; and
decoding the dependency instruction, the dependency instruction encoding dependency information relating to the first group of instructions,
wherein the processor switches between a first mode in which dependency instructions are used to determine dependencies and a second mode in which dependency instructions are not used.

9. The method as recited in claim 8 wherein the dependency instruction is a neutral instruction, capable of specifying only one dependency relationship among the group of instructions.

10. A method of determining dependencies among instructions executed on a processor, the method comprising:
fetching a first group of instructions and an associated dependency instruction from a storage; and
decoding the dependency instruction, the dependency instruction encoding dependency information relating to the first group of instructions,
wherein the first group of instructions are in a group of sequential instructions including instructions of a first and second type and the dependency information relates only to instructions of the first type and ignores instructions of the second type.

11. A computer implemented method comprising:
determining dependencies among a first group of instructions; and
generating a dependency instruction associated with the first group of instructions, the dependency instruction specifying dependencies among the first group of instructions,
wherein the dependency instruction is a neutral instruction,
wherein a different neutral instruction is used to specify each of a plurality of possible dependency relationships among the first group of instructions.

12. The method as recited in claim 11 wherein the neutral instruction is an effective no operation (NOP) instruction.

13. The method as recited in claim 11 wherein the dependency instruction includes a field capable of specifying a plurality of dependency relationships among the first group of instructions.

14. A computer program product encoded on one or more computer-readable media, the computer program product comprising:
a first group of instructions; and
a dependency instruction associated with the first group of instructions, the dependency instruction encoding dependency information related to the first group of instructions,
wherein a separate neutral instruction is used to encode each of a plurality of possible dependency relationships among the first group of instructions.

15. The computer program product as recited in claim 14 wherein the neutral instruction is an effective no operation (NOP) instruction.

16. The computer program product as recited in claim 14 wherein the dependency instruction includes a field capable of encoding a plurality of dependency relationships among the first group of instructions.

17. The computer program product as recited in claim 14 wherein the dependency instruction specifies dependency information for a first type of instruction and the first group of instruction is of the first type of instructions, the computer program product further comprising a second dependency instruction that specifies dependency information for a second type of instruction, the first and second types of instructions executing on different execution units.

18. A computer program product encoded on one or more computer-readable media, the computer program product comprising:
a first group of instructions;
a dependency instruction associated with the first group of instructions, the dependency instruction encoding dependency information related to the first group of instructions; and
a mode instruction that specifies processor execution in one of a first mode in which dependency instructions are used to determine dependencies and a second mode in which dependency instructions are not used.

19. The computer program product as recited in claim 18 further comprising an instruction specifying a dependency relationship between instructions in the first group of instructions and an instruction in a second group of instructions in another dependency instruction.

20. The computer program product as recited in claim 18 wherein the dependency instruction specifies dependency information for a first type of instruction and the first group of instruction is of the first type of instructions, the computer program product further comprising a second dependency instruction that specifies dependency information for a second type of instruction, the first and second types of instructions executing on different execution units.

21. A computer program product encoded on one or more computer-readable media, the computer program product comprising:
a first group of instructions; and
a dependency instruction associated with the first group of instructions, the dependency instruction encoding dependency information related to the first group of instructions,
wherein the first group of instructions are of a first type and are part of a second group of sequential instructions that include both first and second types of instructions and wherein the first group of instructions are not sequential and wherein the dependency information specifies dependency information only for the first type of instructions.

22. A method comprising:
determining dependencies among a group of instructions;
indicating the determined dependencies with a neutral instruction, wherein the neutral instruction is executable on a machine without effectively changing machine state; and
scheduling the group of instructions to be executed in an order based, at least in part, on the determined dependencies indicated with the neutral instruction,
wherein the neutral instruction includes one or more of a move operation instruction that moves contents of a store to the same store and a write operation instruction that writes to a read-only store.

23. The method of claim 22 further comprising introducing the neutral instruction into the group of instructions at a predetermined location with respect to the instructions of the group.

24. The method of claim 22 further comprising:
determining a dependency between an instruction of a second group of instructions and at least one instruction of the group of instructions; and
indicating the inter-group dependency with a second neutral instruction.

25. The method of claim 24 further comprising:
determining dependencies among the second group of instructions; and
indicating the dependencies among the second group of instruction with a third neutral instruction.

26. The method of claim 22,
wherein the neutral instruction indicates determined dependencies for those instructions of the instruction group corresponding to a first instruction type; and
indicating with a second neutral instruction the determined dependencies for those instructions of the instruction group corresponding to a second instruction type.

27. A computer-implemented method comprising:
determining dependencies among a group of instructions; and
indicating the determined dependencies with a neutral instruction, wherein the neutral instruction is executable on a machine without effectively changing machine state,
wherein each of a plurality of dependency patterns are indicated with respective ones of a plurality of neutral instructions that include the neutral instruction, and
wherein the determined dependencies are reflected by a particular one of the plurality of dependency patterns.

28. The method of claim 22 embodied as a computer program product encoded on one or more machine-readable media.

29. A computer implemented method comprising:
fetching a group of instructions and a neutral instruction that indicates a dependency pattern of the fetched group of instructions; and
scheduling order of execution of the group of instructions in accordance with the dependency pattern indicated by the neutral instruction,
wherein a separate neutral instruction is used to encode each of a plurality of possible dependency patterns among the group of instructions.

30. The method of claim 29 further comprising decoding the neutral instruction to determine the dependency pattern.

31. The method of claim 29 further comprising:
fetching a second group of instructions and a second neutral instruction that indicates at least one dependency between the group of instructions and the second group of instructions.

32. The method of claim 31 further comprising stalling execution of at least some of the instructions of the second group in accordance with the dependency indicated by the second neutral instruction.

33. The method of claim 29,
wherein the neutral instruction indicates the dependency pattern for those of the fetched group of instructions of a first instruction type;
fetching a second neutral instruction that indicates a second dependency pattern for those of the fetched group of instructions of a second instruction type; and
scheduling execution of those instructions of the second instruction type in accordance with the second neutral instruction.

34. The method of claim 33, wherein the first instruction type includes integer, floating point, or vector.

35. The method of claim 29 embodied as a computer program product encoded on one or more machine-readable media.

36. A computer program product encoded on one or more machine-readable media, the computer program product comprising:
an executable code generator executable to generate executable code, wherein the executable code includes instructions; and
a dependency code generator executable to determine dependency patterns among the instructions and to introduce innocuous instructions in the executable code, and to introduce a mode switching innocuous instruction into executable code, the mode switching innocuous instruction to cause a machine to switch between a first and second modes, wherein, in the first mode, innocuous instructions introduced into an executable code affect execution of instructions, and do not affect execution of instructions in the second mode,
wherein the innocuous instructions correspond to determined dependency patterns,
wherein the instructions are executed in an order based, at least in part, on the dependency patterns.

37. The computer program product of claim 36,
wherein a first set of the innocuous instructions correspond to dependency patterns for instructions of a first instruction type, and wherein a second set of the innocuous instructions correspond to dependency patterns for instructions of a second instruction type.

38. The computer program product of claim 37, wherein the first instruction type includes floating point, integer, or vector.

39. The computer program product of claim 36, wherein the dependency code generator is executable to determine dependencies between groups of instructions and to introduce second innocuous instructions in the executable code, the second innocuous instructions indicating the inter-group dependencies.

40. An apparatus comprising:
a decoder to decode neutral instructions and determine dependency information for instruction groups associated with respective ones of the neutral instructions; and
a scheduler coupled with the decoder, the scheduler to schedule order of execution of instructions in accordance with dependency information conveyed from the decoder,
wherein each possible dependency pattern for a group of instructions is represented by respective ones of a plurality of neutral instructions.

41. The apparatus of claim 40 further comprising an instruction fetcher coupled with the decoder, the instruction fetcher to fetch groups of instructions and their associated neutral instructions.

42. The apparatus of claim 40, wherein the scheduler includes a control logic and a buffer.

43. The apparatus of claim 40 further comprising:
a first instruction type scheduler coupled with the scheduler, the first instruction type scheduler to schedule execution of first instruction type instructions in accordance with first instruction type dependency information conveyed by the decoder; and
a second instruction type scheduler coupled with the scheduler, the second instruction type scheduler to schedule execution of second instruction type instructions in accordance with second instruction type dependency information conveyed by the decoder.

44. The apparatus of claim 43, wherein the first instruction type scheduler is an integer scheduler and the second instruction type scheduler is a floating point scheduler.

45. An apparatus comprising:
one or more processors; and
means for introducing a neutral dependency instruction into a sequence of instructions, wherein the neutral dependency instruction encodes one of a plurality of possible dependency patterns among the sequence of instructions,
wherein a separate neutral dependency instruction is used to encode each of the plurality of possible dependency patterns.

46. The apparatus of claim 45 further comprising means for selecting between a first mode that utilizes the neutral dependency instruction and a second mode that does not utilize the neutral dependency instruction for at least one of the processors.

* * * * *